United States Patent
Lee et al.

(10) Patent No.: US 8,925,411 B2
(45) Date of Patent: Jan. 6, 2015

(54) RACK WITH A RACK TIP

(75) Inventors: Yaw Chuan Lee, Singapore (SG); Boo Siong Lim, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 307 days.

(21) Appl. No.: 13/599,568

(22) Filed: Aug. 30, 2012

(65) Prior Publication Data

US 2014/0060225 A1 Mar. 6, 2014

(51) Int. Cl.
*F16H 55/18* (2006.01)

(52) U.S. Cl.
USPC .............................. 74/409; 74/89.17; 74/425

(58) Field of Classification Search
CPC ............................ F16H 19/04; G03G 21/1814
USPC .......................... 74/89.17, 409, 422, 411, 425
See application file for complete search history.

(56) References Cited

U.S. PATENT DOCUMENTS

| | | | | |
|---|---|---|---|---|
| 3,745,837 A * | 7/1973 | Sawada et al. | ............... | 74/10.39 |
| 3,808,896 A * | 5/1974 | Ogasaware et al. | ............ | 74/10.6 |
| 4,501,218 A * | 2/1985 | Teraura et al. | ............ | 114/144 R |
| 4,669,328 A * | 6/1987 | Kishi et al. | ....................... | 74/422 |
| 4,687,361 A * | 8/1987 | Kikuchi et al. | ............... | 400/322 |
| 4,806,977 A | 2/1989 | Mizutani et al. | | |
| 5,189,923 A * | 3/1993 | Lashbrook | ....................... | 74/409 |
| 5,582,070 A * | 12/1996 | Dominguez | ................... | 74/411 |
| 6,250,169 B1 * | 6/2001 | Weisser | ....................... | 74/89.17 |
| 6,626,055 B2 * | 9/2003 | Magaribuchi | ................ | 74/89.17 |
| 7,140,793 B2 * | 11/2006 | Cook | ............................ | 400/352 |
| 7,164,507 B2 * | 1/2007 | Beck et al. | ..................... | 358/474 |
| 7,651,083 B2 * | 1/2010 | Embury et al. | ............... | 271/127 |
| 8,121,520 B2 * | 2/2012 | Okabe et al. | ................. | 399/111 |
| 8,196,487 B2 * | 6/2012 | Bless et al. | ....................... | 74/437 |
| 8,522,636 B2 * | 9/2013 | Uchida | ........................... | 74/422 |

FOREIGN PATENT DOCUMENTS

| | | |
|---|---|---|
| GB | 191314626 | 0/1914 |
| JP | 5016489 | 3/1993 |
| JP | 9244308 | 9/1997 |
| JP | 2001225536 | 8/2001 |

* cited by examiner

*Primary Examiner* — David M Fenstermacher
(74) *Attorney, Agent, or Firm* — Steven L. Webb

(57) ABSTRACT

A rack with a rack tip is disclosed. The rack tip is slidably mounted to the end of the rack.

20 Claims, 6 Drawing Sheets

RACK WITH A RACK TIP

BACKGROUND

Many flatbed scanners use a rack and pinion gear system to move an optical carriage along a scan bed when scanning. The rack typically extends along the scanning bed and the pinion gear is attached to the carriage. Most of these flatbed scanners can be equipped with an automatic document feeder (ADF). When the scanner is using the ADF for a scan the pinion gear may be moved off of the rack thereby disengaging the pinion gear from the teeth on the rack. This allows the same drive system to be used for driving the carriage in a flatbed scan and driving the ADF in an ADF scan. Once the ADF scan is completed, the pinion gear on the carriage needs to be re-meshed with the teeth on the rack.

DETAILED DESCRIPTION

Figure 1:
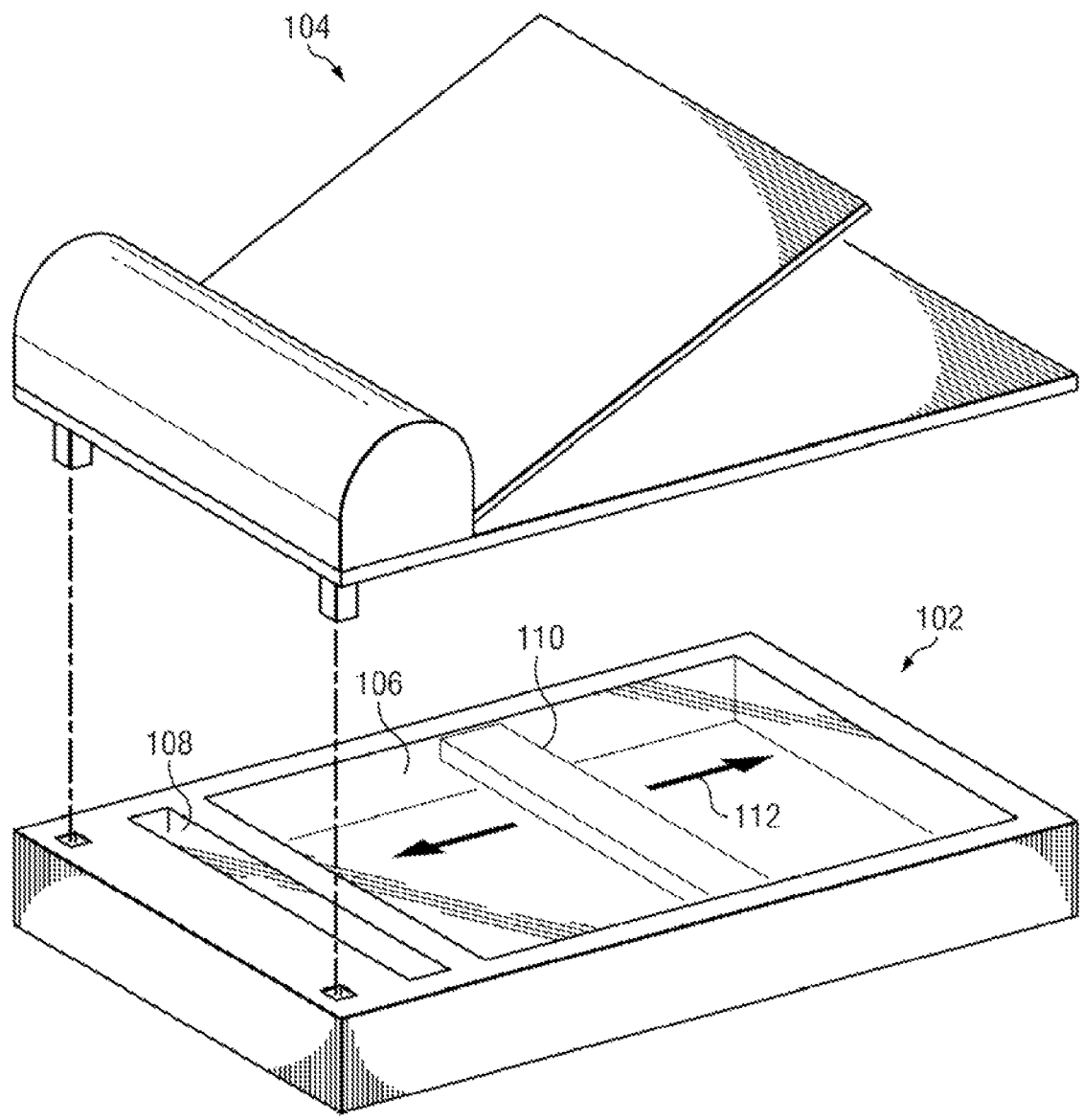
FIG. 1 is an example scanner.

FIG. 1 is an example scanner. Scanner comprises a flatbed scanner 102 and an automatic document feeder (ADF) 104. In this example the ADF 104 can be detached from the flatbed scanner 102. In other examples the ADF 104 may be integrated with the flatbed scanner 102. Flatbed scanner 102 has a flatbed scan window 106 and an ADF scan window 108. An optical carriage 110 is located inside the flatbed scanner and travels underneath the flatbed scan window 106 (shown by arrows 112) when doing a flatbed scan. The optical carriage is located underneath the ADF scan window for ADF scans.

For a flatbed scan, the page to be scanned is placed on the flatbed scan window. During the flatbed scan the page remains stationary while the optical carriage travels underneath the flatbed scan window during the scan. For an ADF scan the carriage is moved to a position under the ADF scan window. During the ADF scan the optical carriage remains stationary while the page is moved through the ADF and past the ADF scan window.

Many scanners use a rack and pinion gear system in the drive train to move the carriage during a flatbed scan. When performing an ADF scan the optical carriage 110 is positioned under the ADF scan window 108. The ADF scan window is typically located at one end of the scanner beyond the flatbed scan window 106. The pinion gear may be disengaged from the rack when the optical carriage is in the ADF scan position. This allows the drive system to be used to drive the paper through the ADF during an ADF scan. When the ADF scan is completed, the pinion gear needs to be re-mounted onto the rack, with the teeth on the pinion gear re-meshed with the teeth on the rack 222.

Figure 2A:
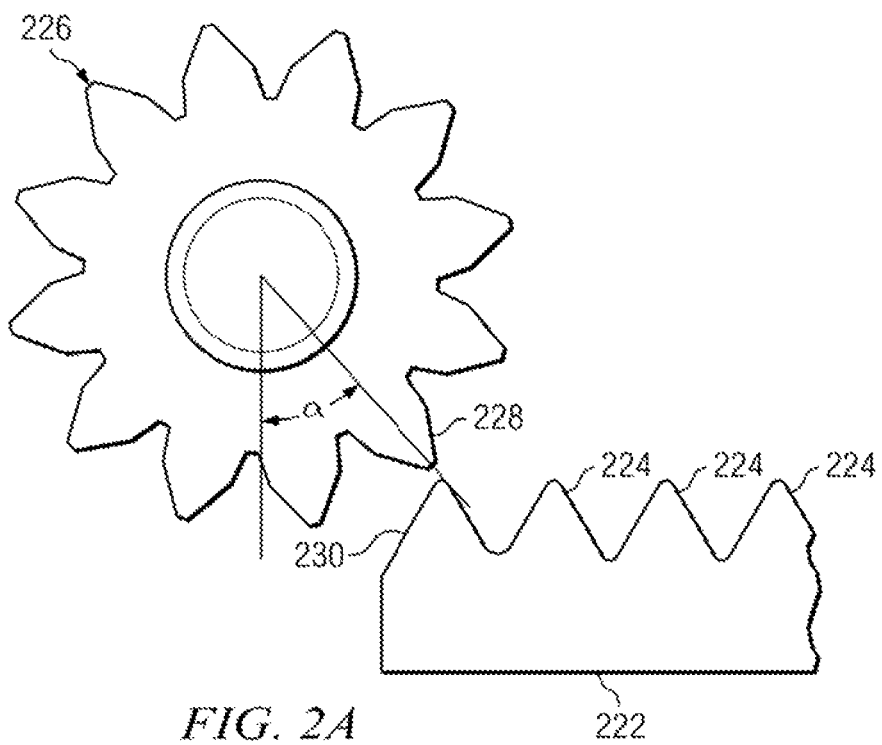
FIG. 2A is an example showing a pinion gear 226 remounting onto a rack 222.

Because some of the gears in the drive system rotate during an ADF scan the pinion gear may not be in the same rotational orientation after the ADF scan is completed. This may cause problems when the pinion gear tries to re-mount back onto the rack when the ADF scan is completed. FIG. 2A is an example showing a pinion gear 226 remounting onto a rack 222. In this example the angle α made by the engaging tooth 228 on the pinion gear is incorrect. This may cause interference between the engaging tooth 228 on the pinion gear and the end tooth 230 on the rack 222. This interference may cause damage to the engaging tooth 228 on the pinion gear, the end tooth 230 on the rack 222, or both. In addition the gears may jam and prevent the pinion gear 226 from remounting back onto the rack.

Figure 2B:
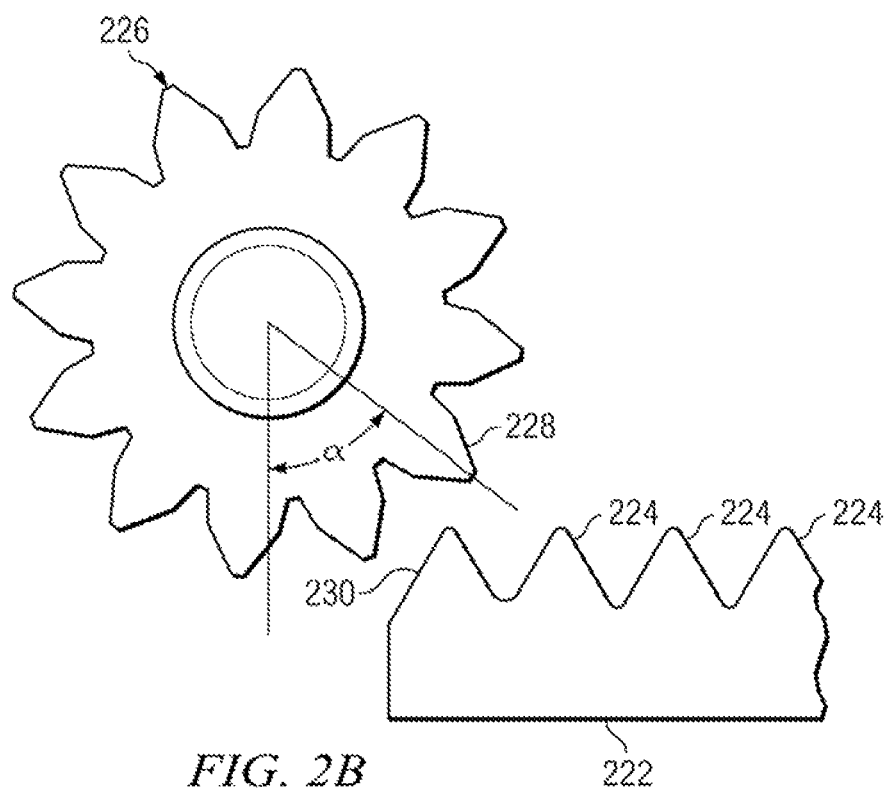
FIG. 2B is another example showing a pinion gear 226 remounting onto a rack 222.

FIG. 2B is another example showing a pinion gear 226 remounting onto a rack 222. In this example the angle α made by the engaging tooth 228 on the pinion gear 226 is correct. When angle α is correct the engaging tooth 228 on the pinion gear 226 meshes correctly with the teeth 224 on the rack 222 and the pinion gear 226 remounts onto the rack 222. Unfortunately the angle α made by the engaging tooth 228 is uncontrolled. Therefore the pinion gear 226 is occasionally unsuccessful at remounting the rack 222. This may cause damage to the end tooth 230 on the rack 222, the teeth on the pinion gear 226, or both. Currently when the pinion gear 226 is unsuccessful at remounting the rack 222, the pinion gear 226 is moved away from the rack 222 and rotated by some amount. The pinion gear 226 is then moved back towards the rack 222 and the re-mounting operation is re-tried. This allows the scanner to recover from failed re-mounting attempts but does not prevent damage to the teeth on the rack 222 and/or on the pinion gear 226.

Figure 3:
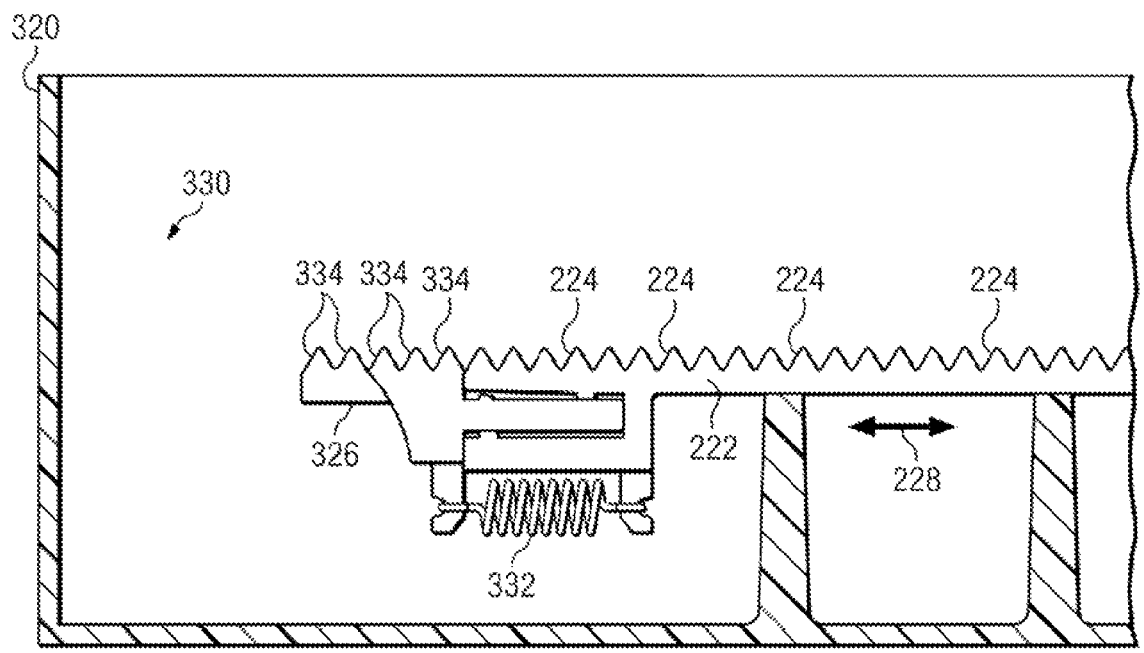
FIG. 3 is a partial cutaway plan view of an example scanner base 320.

In one example a rack tip is slidably attached to the end of a rack. The rack tip is spring loaded such that it can slide along the length of the rack. This allows the rack tip to slide into a position where the teeth in the rack tip align with and mesh into the teeth in the pinion gear. Once the pinion gear is re-meshed with the rack tip the spring forces the rack tip back into position where the teeth on the rack tip align with the teeth on the rack. FIG. 3 is a partial cutaway plan view of an example scanner base 320. Scanner base 320 is where the optical carriage is mounted and typically contains the drive system used to move the optical carriage 110. The drive system is used to move the carriage underneath the flatbed scan window, and to move the carriage to the ADF scan position. In this example the drive system contains a rack and pinion gear system. FIG. 3 shows rack 222 mounted to scanner base 320. Rack 222 is typically a long rectangular beam with teeth 224 formed along one side (shown on the top side in FIG. 3). The rack 222 has a long axis as shown by arrow 228. In this example rack 222 is fabricated from a plastic material, for example Acrylonitrile butadiene styrene (ABS). In other examples rack may be fabricated from metal, for example aluminum.

Figure 4:
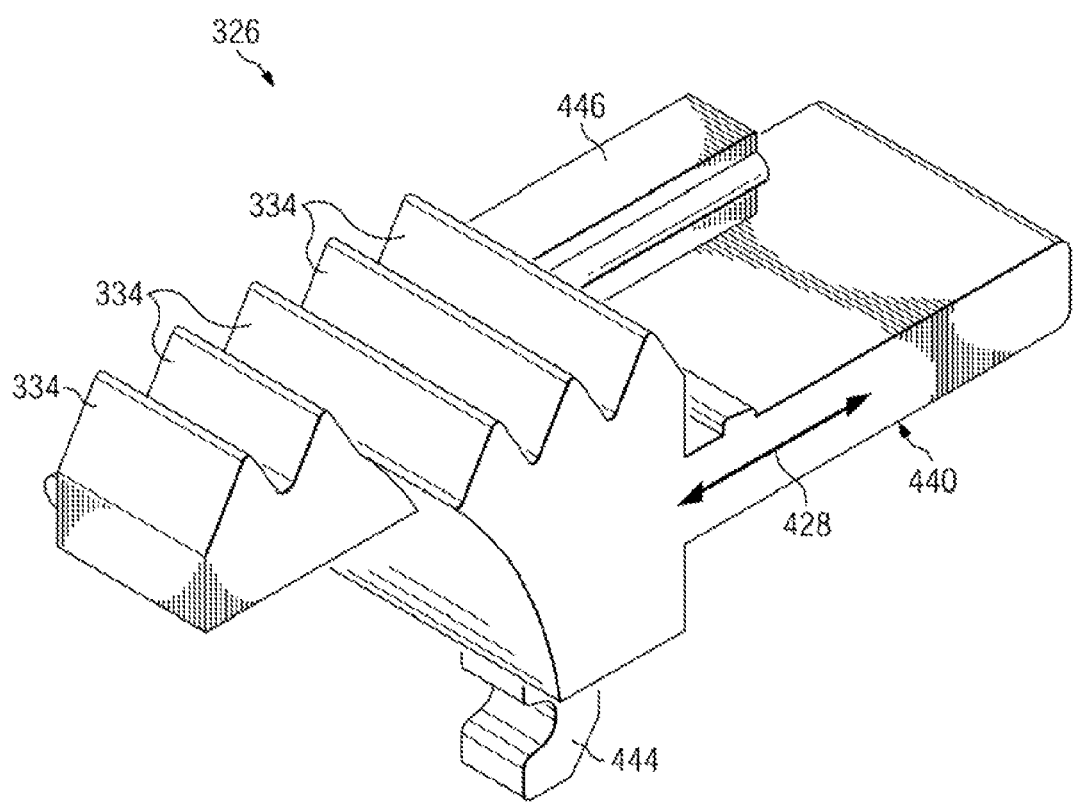
FIG. 4 is an orthogonal view of an example rack tip 326.

Rack 222 has a rack tip 326 mounted at one end of the rack 222. Rack tip 326 is mounted into a slot formed in the end of rack 222. The slot allows the rack tip 326 to slide along the long axis 228 of rack 222. Rack tip 326 is held into the slot by spring 332. FIG. 4 is an orthogonal view of an example rack tip 326. Rack tip 326 has teeth 334 along the top edge of one side of the rack tip 326. Rack tip 326 has a beam section 440 on the opposite side from the teeth 334. The beam section 440 mates with the slot in the rack 222. A hook 444 is located on the bottom side of the rack tip 326 and is used to connect the spring 332 that holds the rack tip 326 into the slot in rack 222. The beam section 440 also serve to constraint the rack tip 326 in the direction perpendicular to 428 when mounted on the rack 222. The rack tip 326 has a long axis 428 that aligns with (i.e. is parallel with) the long axis 228 of the rack 222 when the rack tip 326 is mounted in the rack 222. In some examples there may be a horizontal bar 446 on the top of beam 440. The horizontal bar 446 may help to constraint the rack tip 326, in the direction perpendicular to the 428 direction. There is also a horizontal bar beneath the beam section 440 having similar function as horizontal bar 446. In one example the rack tip may be fabricated from a plastic material, for example Polyoxymethylene (POM).

Figure 5:
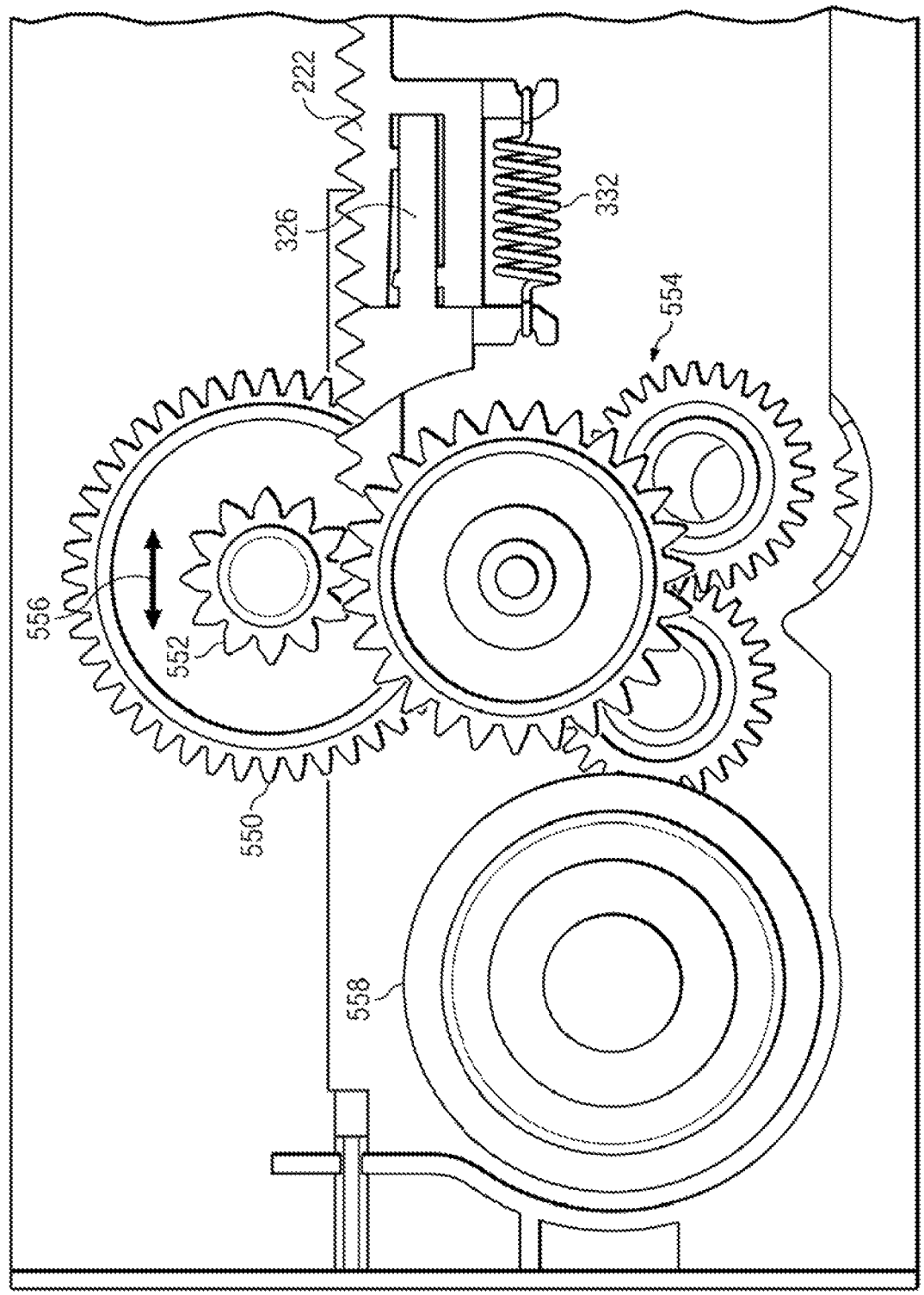
FIG. 5 is a plan view of an example drive train for a scanner during ADF scan.

FIG. 5 is a plan view of an example drive train for a scanner during ADF scan. The scanner has a rack and pinion gear system as part of the drive train. The rack 222 is shown as a feature in a scanner base. A rack tip 326 is mounted into a slot in the end of the rack 222 and held in place by spring 332. The pinion gear 552 is the small gear on a cluster gear 550. The cluster gear is attached to the optical carriage, but the carriage is not shown for clarity. The drive train also comprises a number of transmission gears 554 and 558. When the pinion gear 552 is disengaged from the rack tip 326 the cluster gear 550 (including the pinion gear 552) can be moved (translated) in a horizontal axis (as shown by arrows 556) between two positions. The two positions are the ADF scan position and the rack tip 326 re-mounting position. The left most position (as shown in FIG. 5) is the ADF scan location/position. In this position the pinion gear 552 is disengaged from the rack tip 326 and therefore free to rotate without moving the optical carriage 110. In this position the drive train can be used to move paper through the ADF during an ADF scan.

Figure 6:
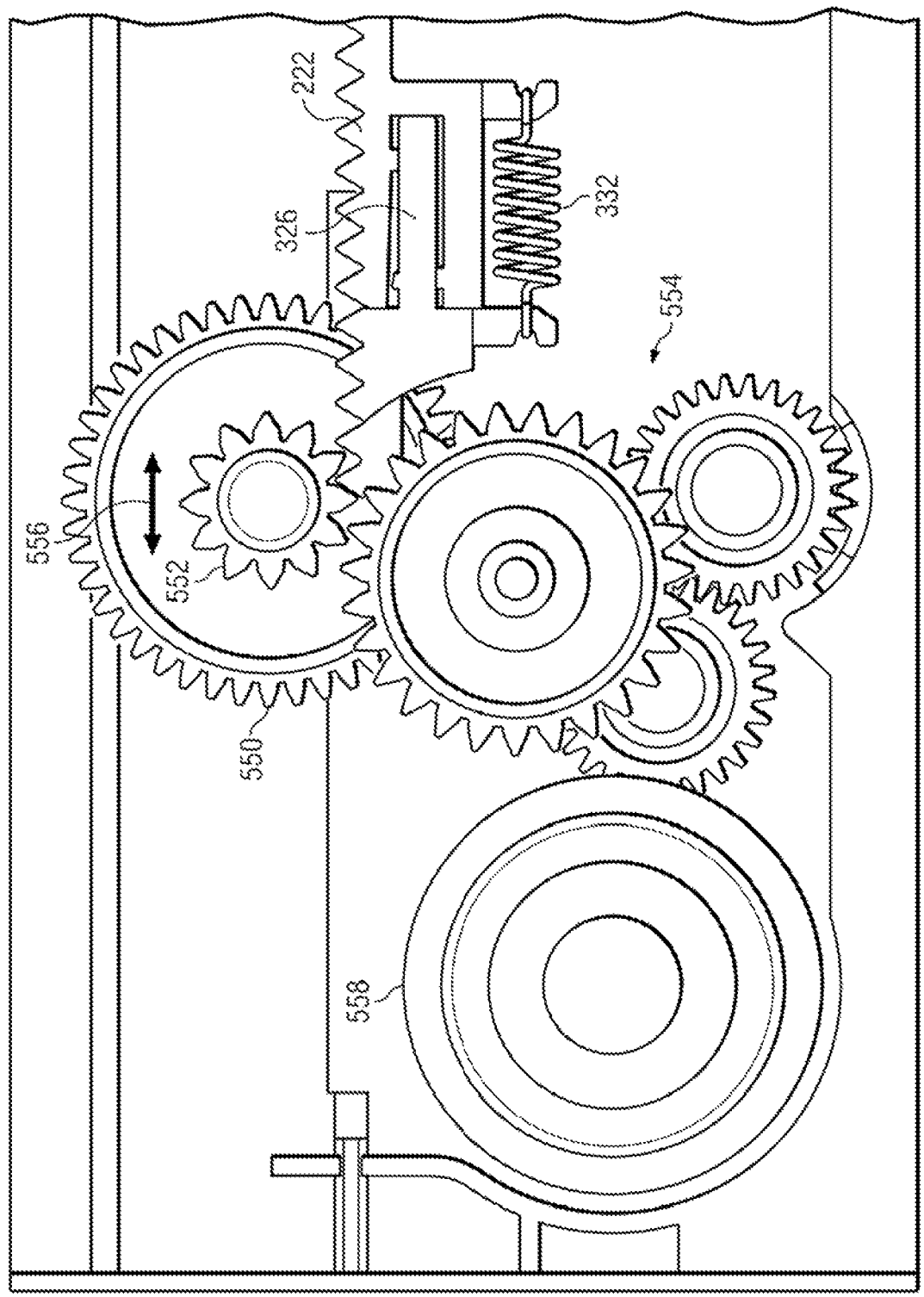
FIG. 6 is the plan view of the example drive train from FIG. 5, where the scanner is mounting back to the rack on the rack tip.

FIG. 6 is the plan view of the example drive train from FIG. 5. In FIG. 6 the cluster gear 550 (including the pinion gear 552) has been translated to the rack tip re-mounting location/position. In this position the teeth on the pinion gear 552 are ready to re-engage the teeth on the rack tip 326. FIG. 6 shows the teeth on the pinion gear 552 in the proper rotational position to re-engage with the teeth on the rack tip 326.

In some remounting attempts the pinion gear 552 will not have the correct rotational orientation to re-mount the rack tip 325. In these cases the rack tip 326 will move/deflect to accommodate the rotational orientation of the pinion gear. The movement/deflection can be a sliding or translation motion along the long axis 428 of the rack tip 326. The movement/deflection of the rack tip can be in a direction perpendicular to the long axis 428. Or the movement/deflection of the rack tip can be a combination of a sliding or translation motion along the long axis 428 and a deflection in a direction perpendicular to the long axis 428.

In one example the spring 332 allows the rack tip 326 to be translated away from the rack 222 along the slot as the pinion gear 552 tries to re-mount onto the rack tip 326. Once the pinion gear 552 re-meshes with the teeth on the rack tip 326 the spring 332 forces the rack tip 326 back into the slot in the end of the rack 222. In another example the rack tip 326 is fabricated from a non-ridged material, for example Polyoxymethylene (POM). When the pinion gear 552 tries to remount onto the rack tip 326, the rack tip 326 will bend and allow the left end of the rack tip 326 to deflect in an axis perpendicular to the long axis 428. The bending may occur in the beam section 440 or along the length of the rack tip 326. In another example the rack tip 326 may rotate about the right edge of the rack tip 326 using up some of the clearance between the rack tip 326 and the slot in the rack 222.

The movement/deflection of the rack tip 326 may only involve a translation of the rack tip 326, a bending of the rack tip 326, or a rotation of the rack tip 326, or may be a combination of two or more of these types of motion/deflection. In some cases the left end of the rack tip may deflect in the range between 0.25 mm-1.5 mm in a direction perpendicular to the long axis 428.

Figure 7A:
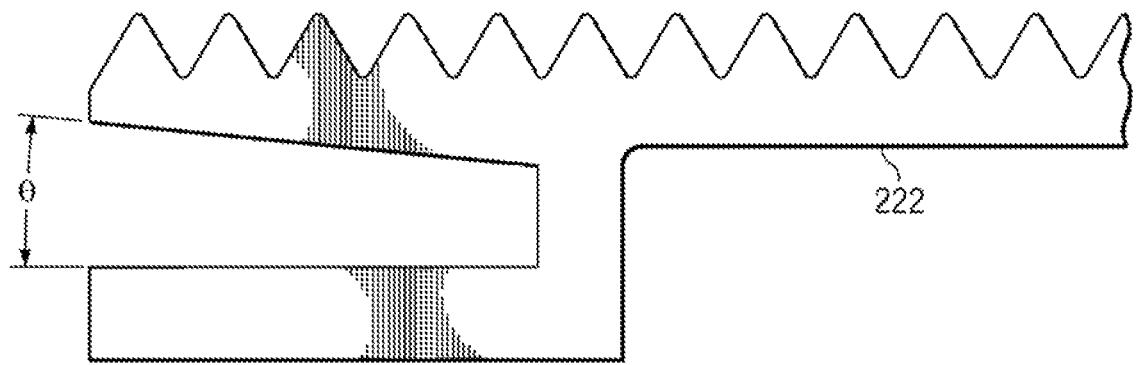
FIG. 7A is a partial plan view of an example rack.
Figure 7B:
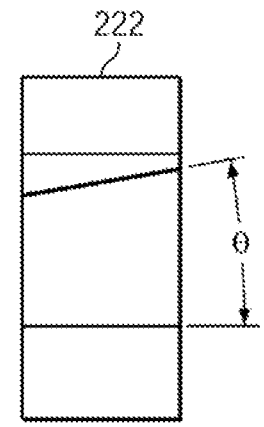
FIG. 7B is another example of a rack showing an end view.

In some examples the slot in the end of the rack 222 may be tapered to help guide the rack tip back into the slot. FIG. 7A is a partial plan view of an example rack. There is a taper shown by angle θ in the slot formed in the end of rack 222. The taper runs from the front of the slot to the back of the slot. The taper helps guide the rack tip back into the slot after the rack tip has moved during a re-mounting attempt. FIG. 7B is another example of a rack showing an end view. In this example the taper runs from side to side. The taper helps guide the rack tip back into the slot after the rack tip has moved during a re-mounting attempt.

The examples above show a rack with a rack tip in a stand-alone scanner. The rack with a rack tip can be used in other devices as well, for example a multi-function printer (MFP), a fax machine, a copier, and the like.

What is claimed is:

1. A rack and pinion system, comprising:
    a rack having a long axis with teeth formed on one side of the rack along the long axis, the rack having one end;
    a rack tip having a first end and a second end opposite the first end, the rack tip having a long axis between the first end and the second end, the rack tip having teeth formed on one side along the long axis at the second end, the first end slidably mounted to the one end of the rack, wherein the long axis of the rack tip is parallel with the long axis of the rack, and wherein the teeth on the rack tip are aligned with the teeth on the rack when the rack tip is slidably mounted in the rack; and
    a spring coupled between the rack and the rack tip slidably biasing the rack tip towards the rack along the long axis.

2. The rack and pinion system of claim 1, wherein the second end of the rack tip can deflect in an axis perpendicular to the long axis.

3. The rack and pinion system of claim 2, wherein the rack tip can bend during the deflection of the second end.

4. The rack and pinion system of claim 2, wherein the rack tip rotates about the first end of the rack tip during the deflection of the second end.

5. The rack and pinion system of claim 1, further comprising:
    a pinion gear with teeth meshed with the teeth on the rack, when the pinion gear is rotated the pinion gear traverses along the long axis of the rack and the rack tip, the pinion gear moving between two positions at the second end of the rack tip;
    when the pinion gear is in the first position the teeth on the pinion gear are no longer meshed with the teeth on the rack tip; and
    when the pinion gear is in the second position the teeth on the pinion gear are positioned to re-engage with the teeth on the rack tip and the rack tip slides along the long axis to assist in the re-engagement.

6. The rack and pinion system of claim 1, further comprising:
    a pinion gear with teeth meshed with the teeth on the rack, when the pinion gear is rotated the pinion gear traverses along the long axis of the rack and the rack tip, the pinion gear moving between two positions at the second end of the rack tip;
    when the pinion gear is in the first position the teeth on the pinion gear are no longer meshed with the teeth on the rack tip; and
    when the pinion gear is in the second position the teeth on the pinion gear are positioned to re-engage with the teeth on the rack tip and the second end of the rack tip deflects perpendicular to the long axis to assist in the re-engagement.

7. The rack and pinion system of claim 1, wherein the spring supplies a force between 1 N and 2 N to the rack tip.

8. The rack and pinion system of claim 5, further comprising:
an optical carriage coupled to the pinion gear where the optical carriage moves in a flatbed scanning axis when the pinion gear traverses along the long axis of the rack and the rack tip.

9. The rack and pinion system of claim 8, wherein the optical carriage is in an automatic document feeder ("ADF") scanning position when the pinion gear is in the first position.

10. The rack and pinion system of claim 9, further comprising:
a motor and transmission system that moves the optical carriage in a flatbed scanning axis during a flatbed scan and moves media through an ADF during an ADF scan.

11. A scanning mechanism comprising:
an optical carriage that moves in a scanning axis during a flatbed scan and is positioned in an automatic document feeder ("ADF") scan location during an ADF scan;
a drive system used to move the optical carriage, the drive system comprising:
a rack having a long axis with teeth formed on one side of the rack along the long axis, the rack having one end;
a rack tip having a first end and a second end opposite the first end, the rack tip having a long axis between the first end and the second end, the rack tip having teeth formed on one side along the long axis at the second end, the first end slidably mounted to the one end of the rack where the long axis of the rack tip is parallel with the long axis of the rack, the teeth on the rack tip are aligned with the teeth on the rack when the rack tip is slidably mounted in the rack; and
a spring coupled between the rack and the rack tip slidably biasing the rack tip towards the rack along the long axis.

12. The scanning mechanism of claim 11, further comprising:
a pinion gear with teeth meshed with the teeth on the rack, when the pinion gear is rotated the pinion gear traverses along the long axis of the rack and the rack tip, the pinion gear moving between two location at the second end of the rack tip;
when the pinion gear is in the ADF scan location the teeth on the pinion gear are no longer meshed with the teeth on the rack tip; and
when the pinion gear is in the second position the teeth on the pinion gear are positioned to re-engage with the teeth on the rack tip and the rack tip slides along the long axis to assist in the re-engagement.

13. The scanning mechanism of claim 11, further comprising:
a pinion gear with teeth meshed with the teeth on the rack, when the pinion gear is rotated the pinion gear traverses along the long axis of the rack and the rack tip, the pinion gear moving between two location at the second end of the rack tip;
when the pinion gear is in the ADF scan location the teeth on the pinion gear are no longer meshed with the teeth on the rack tip; and
when the pinion gear is in the second position the teeth on the pinion gear are positioned to re-engage with the teeth on the rack tip and the second end of the rack tip deflects perpendicular to the long axis to assist in the re-engagement.

14. The scanning mechanism of claim 11, wherein the rack tip is slidably mounted in a slot formed in the one end of the rack.

15. The scanning mechanism of claim 14, wherein the slot is tapered.

16. The rack and pinion system of claim 1, wherein the rack tip is slidably mounted in a tapered slot formed in the one end of the rack.

17. A scanner comprising:
a pinion gear adjustable between a first scanning mode and a second scanning mode, the first scanning mode allowing the pinion gear to drive an optical carriage to move the optical carriage over media in the scanner, and the second scanning node allowing the pinion gear to drive an automatic document feeder (ADF) to move media through the scanner; and
a rack assembly, wherein in the first scanning mode, the pinion gear is engaged with the rack assembly to allow the pinion to translate along the rack assembly to move the optical carriage along the rack assembly, the rack assembly including:
a rack including teeth to mate with teeth of the pinion gear;
a rack tip including teeth to mate with teeth of the pinion gear, the rack tip being movably coupled between a continuous position in which the teeth of the rack tip align with the teeth of the rack and a noncontinuous position in which the teeth of the rack tip do not align with the teeth of the rack; and
a spring coupled to the rack and rack tip to bias the rack tip towards the continuous position.

18. The scanner of claim 17, wherein in the second scanning mode, the pinion gear is disengaged from the rack assembly.

19. The scanner of claim 17, wherein in the continuous position, the rack tip is slidably mounted in a tapered slot formed in the rack.

20. The scanner of claim 17, wherein in the noncontinuous position, the rack tip is deflected away from a longitudinal axis of the rack.

* * * * *